United States Patent
Haartsen

[19]

[11] Patent Number: 6,112,088
[45] Date of Patent: Aug. 29, 2000

[54] RADIO COMMUNICATIONS SYSTEM AND METHOD FOR MOBILE ASSISTED HANDOVER BETWEEN A PRIVATE NETWORK AND A PUBLIC MOBILE NETWORK

[75] Inventor: Jacobus Cornelis Haartsen, Staffanstorp, Sweden

[73] Assignee: Telefonaktiebolaget, L.M. Ericsson, Stockholm, Sweden

[21] Appl. No.: 08/708,034

[22] Filed: Aug. 30, 1996

[51] Int. Cl.[7] ...................................................... H04Q 7/20
[52] U.S. Cl. ........................ 455/437; 455/426; 455/502; 455/552; 370/331; 370/336
[58] Field of Search ..................... 455/437, 440, 455/442, 443, 445, 444, 436, 502, 525, 552, 554, 555; 370/330, 331, 332, 333, 336, 337

[56] References Cited

U.S. PATENT DOCUMENTS

| | | | |
|---|---|---|---|
| 5,109,528 | 4/1992 | Uddenfeldt | 455/33.2 |
| 5,392,331 | 2/1995 | Patsiokas et al. | 455/437 |
| 5,406,615 | 4/1995 | Miller et al. | 455/436 |
| 5,428,668 | 6/1995 | Dent et al. | 379/59 |
| 5,590,172 | 12/1996 | Lodwig et al. | 455/436 |

FOREIGN PATENT DOCUMENTS 695104  1/1996  European Pat. Off. .

WO95/1694  1/1995  WIPO .

*Primary Examiner*—Lee Nguyen
*Attorney, Agent, or Firm*—Myers Bigel Sibley & Sajovec

[57] ABSTRACT

Mobile handover between a private radio communications network connected to the public switch telephone network and a public land mobile network also connected to the public switch telephone network are provided by a radio communications mobile terminal supporting simultaneous communication connections between the two uncoordinated networks. The mobile terminal monitors a base station of the public land mobile network during idle frames of communication connections with the private radio communications network, thereby synchronizing the mobile terminal to both the base of the public land mobile network and the private radio communications network. Call interruption is prevented during handover by maintaining simultaneous communications with the private radio communications network and the public land mobile network through the use of two half-rate channels or dual-slot communications where both the public land mobile network and private radio communications network operate pursuant to compatible TDMA standards. Handover is initiated when the mobile terminal detects a signal quality which violates a predetermined switching criteria and passes the PSTN phone line number of the private radio communications network to the base station of the public land mqbile network which in turn requests re-routing of the call from the PSTN switch.

24 Claims, 5 Drawing Sheets

RADIO COMMUNICATIONS SYSTEM AND METHOD FOR MOBILE ASSISTED HANDOVER BETWEEN A PRIVATE NETWORK AND A PUBLIC MOBILE NETWORK

FIELD OF THE INVENTION

This invention relates to communication systems and more particularly to private radio communication networks within the coverage area of a public land mobile network.

BACKGROUND OF THE INVENTION

Public cellular networks (public land mobile networks) are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems* by Balston, et al., published by Artech House, Norwood, Mass., 1993.

Traditional analog radiotelephone systems generally employ a system referred to as frequency division multiple access (FDMA) to create communications channels. As a practical matter well-known to those skilled in the art, radiotelephone communications signals, being modulated waveforms, typically are communicated over predetermined frequency bands in a spectrum of carrier frequencies. These discrete frequency bands serve as channels over which cellular radiotelephones communicate with a cell, through the base station or satellite serving the cell. In the United States, for example, Federal authorities have allocated to cellular communications a block of the UHF frequency spectrum further subdivided into pairs of narrow frequency bands, a system designated EIA-553 or IS-19B. Channel pairing results from the frequency duplex arrangement wherein the transmit and receive frequencies in each pair are offset by 45 Mhz. At present there are 832, 30-Khz wide, radio channels allocated to cellular mobile communications in the United States.

The limitations on the number of available frequency bands present several challenges as the number of subscribers increases. Increasing the number of subscribers in a cellular radiotelephone system generally requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of frequency bands available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system of only several hundred frequency bands.

The past decades have shown a considerable rise in the deployment of mobile telephony. With a slow start of the analog standards like AMPS, NMT and TACS, mobile telephony has really hit the consumer markets with the advanced digital standards like GSM and D-AMPS. In addition to progress in mobile phone features like size and battery life, much progress has been made at the network side as well. Increasingly dense cell reuse plans have been complemented with hierarchical cell structures, where macrocells cover entire districts, microcells cover smaller parts like streets, and picocells cover very small areas the size of a few rooms. Important for the hierarchical cell structure is that each base station deployed (ranging from macro to pico base stations) is part of the same Public Land Mobile Network (PLMN). When a mobile user wanders from a macrocell to a microcell area, the call can be handed off from a macro base station to a micro base station without the user noticing it. This is particularly true for digital phone systems that apply TDMA: being handed off from one base station to another within a coordinated PLMN for the mobile phone usually only involves the change of a time slot.

In order to facilitate the network to reroute the call from one base station to another with the PLMN, the mobile phone performs measurements which are reported to the base it currently connects to using a fast or slow associated control channel (FACCH or SACCH). The mobile measurements help the base station controller of the PLMN in finding the best alternative base station on which the call can be continued.

Recently, private radio communications networks for residential and business areas are being developed that use the same air-interface as the public cellular network, but do not form an integrated part with the overlaying public cellular network. In this sense, these private systems are not micro or pico networks since there is no direct connection between these private systems and the public cellular network. For example, for residential usage, private base stations can be used as described in U.S. Pat. No. 5,428,668 which only connect to the PSTN. In business or office networks applying a Private Branch Exchange ("PBX"), radio base stations belonging to the same private network communicate with each other, but none of them communicates directly with the overlaying PLMN. Because the private radio systems have only a limited range, a call drop will result when the mobile user moves out of the coverage range, unless the overlaying public cellular network can take over the call. Therefore, a handover from the private mobile network to the public cellular network is highly desirable. However, because there is no coordination between the private radio system and the PLMN, problems are encountered in achieving a handover to the PLMN from the private network.

SUMMARY OF THE INVENTION

It is, therefore, an object of the present invention to provide improved radio communications mobile terminals useable with both a public land mobile network, as well as a private radio communications network within the coverage area of the public land mobile network.

It is another object of the present invention to provide a method for mobile assisted handover from a private radio communications network to an overlaying public land mobile network without requiring call interruption.

In the present invention, these and other objects are met by providing a mobile terminal which communicates with both a private radio communications network and an overlaying public land mobile network. The mobile terminal may be synchronized with a base station of the public land mobile network while a call is underway between the mobile terminal and the private radio communications network. The mobile terminal thereby synchronizes timing of transmissions between the otherwise uncoordinated base station of the public land mobile network and the private base station of the private radio communications network. The mobile terminal further may determine when the ongoing call should be handed off to the overlaying public land mobile network based on indications of communications signal deterioration with respect to a predetermined switching criteria. When a violation of the switching criteria is detected by the mobile terminal, it contacts the public land mobile network and transmits to the PLMN the PSTN number of the private radio communications network to initiate re-routing of the call from the private radio communications network to the public land mobile network.

In one embodiment of the present invention, the mobile terminal includes detecting means operably connected to the radio transceiving means which detects the signal quality of communications between the mobile terminal and the private radio communications network during radio communication between the mobile terminal and the private radio communications network. The mobile terminal also includes comparing means operably connected to the detecting means for comparing the detected signal quality to a predetermined switching criteria.

A simultaneous communications establishing means including synchronizing means within the mobile terminal synchronizes the mobile terminal to the public land mobile network by monitoring the public land mobile network during idle frames while synchronized communications are underway between the mobile terminal and the private radio communications network. Reporting means within the mobile terminal provides for re-routing the first radio communication connection call from the private radio communication network to the public land mobile network when the detected signal quality from the private communication network violates the predetermined switching criteria. The handover is accomplished between the uncoordinated private radio communication network and the public land mobile network without call interruption by establishing a second simultaneous radio communication connection between the mobile terminal and the public land mobile network when the detected signal quality violates a predetermined switching criteria. The reporting means reports the wire line number of the private radio communication network to the public land mobile network and requests re-routing of the call underway between the mobile terminal and the private radio communication network.

The two simultaneous radio communication connections are provided without the necessity for redundant transmit and receive circuits because the synchronizing means of the mobile terminal synchronizes the terminal to both systems, thereby allowing it to operate two half-channels, one for communications with each system. This synchronization may be accomplished by the mobile terminal without any requirement for the private radio communication network and the public land mobile network to be otherwise coordinated.

According to another aspect of the present invention, methods are provided for mobile-assisted handover between a private radio communications network connected to a PSTN switch and a public land mobile network. The signal quality of the private radio communications network during a first radio communication connection with the mobile terminal is detected at the mobile terminal. If the detected signal quality violates a predetermined switching criteria, a second radio communication connection is established between the mobile terminal and the public land mobile network simultaneously with the first radio communication connection between the mobile terminal and the private radio communications network.

The mobile terminal reports the PSTN number of the private radio communications network to the public land mobile network over the second radio communication connection. Responsive to this report and request, the public land mobile network initiates re-routing of the first radio communication connection from the PSTN switch to the public land mobile network from the original routing through the private radio communication network. The mobile terminal then accepts and continues the original call routed through the public land mobile network and terminates simultaneous communications.

Accordingly, the mobile terminal and method for handover from a private radio communications network to an overlaying public land mobile network of the present invention overcome the particular problems of accomplishing a call handoff from a private radio communications network to a public land mobile network without call interruption. This objective is accomplished where both systems operate pursuant to compatible TDMA standards without any necessity for redundant transmit and receive circuitry within the mobile terminal. By synchronizing to both the public land mobile network and the private radio communications network, the mobile terminal is able to maintain two simultaneous communication connections simply by utilizing two half-rate channels or two slots, one for each communication connection.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
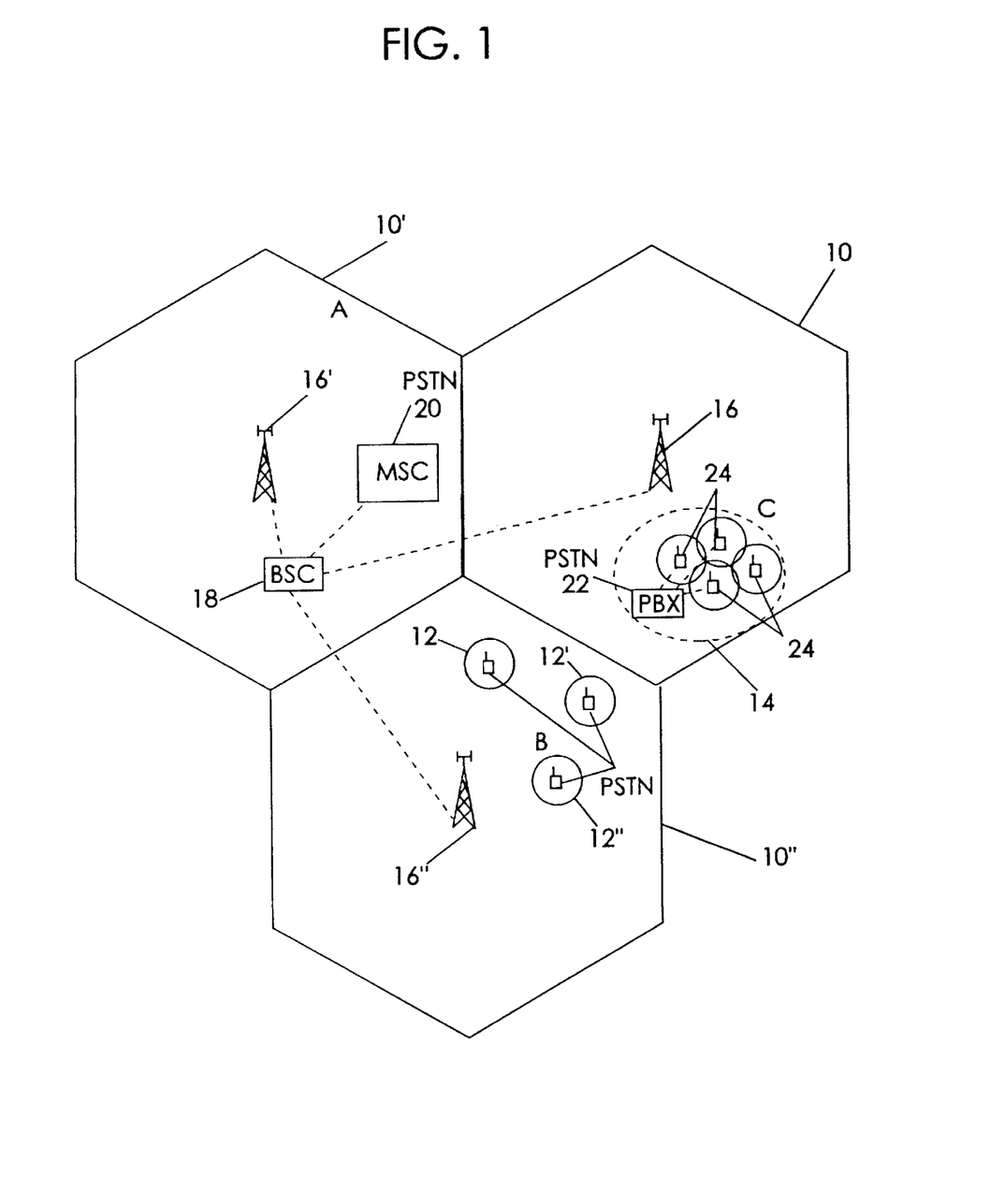
FIG. 1 schematically illustrates a portion of a public land mobile network including private radio communications networks within the coverage area of the public mobile land network.

Referring now to FIG. 1, an operating environment of the present invention will be described. The present invention relates to mobile terminals and methods for using the same within hierarchial cell structures which may be found in advanced cellular phone systems, for example, in order to increase capacity in densely populated areas. Hierarchial cell structures may be described at a variety of levels from macrocell 10, 10', 10" at the highest level covering cells with radii which may be in the order of a few kilometers and may optionally also include lower levels down to picocells at the lowest level covering cells with radii which may be in the order of only a few tens of meters. Macrocells 10, 10', 10" define the cellular structure of the public land mobile network or wide area cellular network as is well known and will be understood by one of ordinary skill in the art. Uncoordinated radio communications networks such as residential private radio communications networks 12, 12', 12" may also be found within the coverage area of the wide area cellular network and may be private base stations such as those described in U.S. Pat. No. 5,428,668, which is incorporated herein by reference as if set forth in its entirety.

Also illustrated in FIG. 1 is office private radio communications network 14. 12, 12', 12" and residential network 14 are private radio communications networks which have connections to the public switched telephone network ("PSTN") via a PSTN switch or exchange 66 (not shown in FIG. 1) or to an ISDN wire line network. Accordingly, office private radio communications network 14 and residential private radio communications network 12, 12', 12" have an associated PSTN phone number by which they communicate over the public switched telephone network (or ISDN).

As illustrated in FIG. 1, macrocells 10, 10', 10" of the public land mobile network each include at least one base station 16, 16', 16". Base stations 16, 16', 16" are connected via a wired infrastructure as is known to those of ordinary skill in the art. As illustrated in FIG. 1, the wired infrastructure includes base station controller 18 and mobile services switching center 20. The particulars of the infrastructure of the public land mobile network will not be discussed further herein except to note that the wired infrastructure of the public land mobile network also includes a connection to the PSTN providing the public land mobile network access to the PSTN switch 66 (not shown in FIG. 1).

When a mobile terminal user travels in the cellular area of the public land mobile network, the user's connection is handed off between base station 16, 16', 16" depending upon the mobile-to-base distance and the interference situation. This assures that the mobile terminal user keeps a high quality channel even as the user moves from one cell to the other. Because base stations 16, 16', 16" are all interconnected, methods for controlling base station 16, 16', 16" transmission and re-routing of calls from one base station 16, 16', 16" to another in order to maintain a high quality channel (handover) is known in current public land mobile networks.

Private radio communications network 14 as illustrated in FIG. 1 is a private radio communications network which connects to the PSTN via private branch exchange ("PBX") 22. Private radio communications network 14 further includes macrocell base stations 24. Macrocell 14 and base stations 24 cannot be controlled by the public land mobile network as they are not a coordinated part of the PLMN. In addition, signaling through the PSTN line to PBX 22 may create problems when a call on the PSTN line is in progress.

Figure 2:
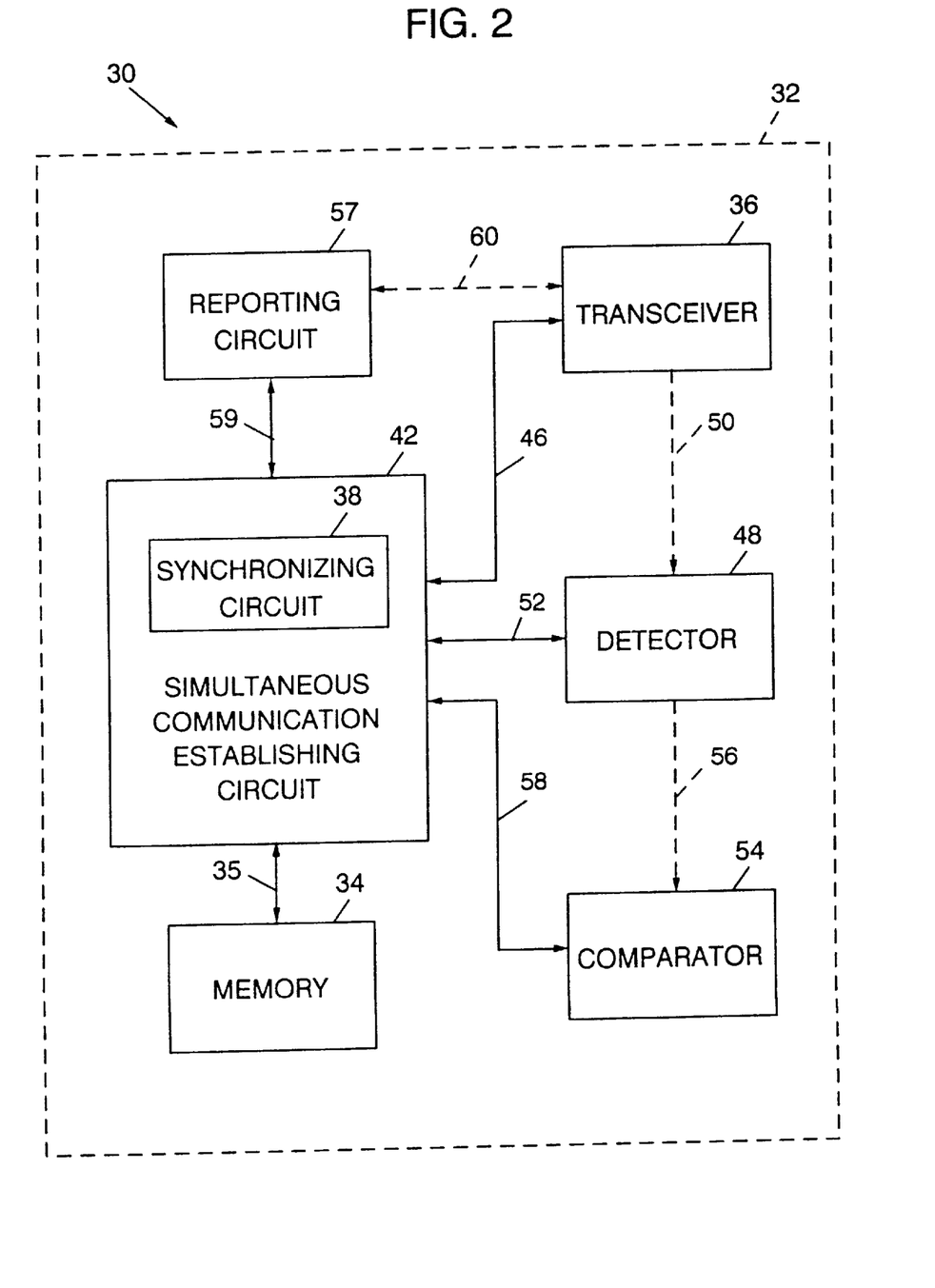
FIG. 2 is a schematic block diagram of a mobile terminal according to the present invention.

Referring now to FIG. 2, an embodiment of a radio communications mobile terminal 30 according to the present invention is illustrated. Mobile terminal 30 includes portable housing 32 or other housing means. Memory chip 34 or other storage means for storing the PSTN number of private communications network 14 and for storing a switching criteria is also located within housing 32. It is to be understood that the storage means may but need not be a common device for both the PSTN number and the switching criteria. For example, the PSTN number could be stored in digital memory while the switching criteria could be stored as an analog reference voltage. Memory 34 is connected to simultaneous communication establishing means 42 via bus 35.

Mobile terminal 30 also includes transceiver 36 or other radio transceiving means extending within housing 32 for receiving and transmitting radio communication signals between mobile terminal 30 and private radio communication network 14 and between mobile terminal 30 and the public land mobile network. Transceiver 36 may include an antenna (not shown) extending from housing 32. Transceiver 36 is operably connected to simultaneous communications establishing means 42 by electrical connection 46. Simultaneous communications establishing mean 42 includes synchronizing circuit 38 or other synchronizing means for synchronizing radio communications between mobile terminal 30 and private radio communications network 14 and the public land mobile network.

Also located within housing 32 is detector circuit 48 or other detecting means for detecting a signal quality from private radio communication network 14 during a first radio communication connection between mobile terminal 30 and private radio communication network 14. Detector circuit 48 is operably connected to transceiver 36. This connection may alternatively be directly as illustrated by the dotted line 50 or via bus 52 through simultaneous communication establishing means 42.

Also illustrated in FIG. 2 located within housing 32 is comparator circuit 54 or other comparing means for comparing the detected signal quality from detector 48 to a predetermined switching criteria stored in storage means 34. Comparator 54 is operably connected to detector 48 either directly as illustrated by dotted line 56 or via bus 58 to simultaneous communication establishing means 42.

Simultaneous communication establishing means 42, which is also located within housing 32, provides a controlling means for establishing a second radio communication connection between mobile terminal 30 and the public land mobile network simultaneously with a first radio communication connection between mobile terminal 30 and private radio communications network 14 if the detected signal quality of the first connection falls below the switching criteria stored in storage means 34. Reporting circuit 57 or other reporting means reports the wire line (PSTN or ISDN) telephone number of private radio communications network 14 stored in storage means 34 to the public land mobile network when the detected signal quality falls below the stored switching criteria and for requesting re-rerouting of the first radio communication connection from private radio communications network 14 to the public land mobile network. The stored PSTN number and request for re-rerouting are transmitted to the public land mobile network over the second radio communication connection established by simultaneous communication establishing means 42. Reporting circuit 57 is operably connected to simultaneous communications establishing means 42 via bus 59. Reporting circuit 57 is also operably connected to transceiver 36 either directly as illustrated by dotted line 60 or via bus 59 to simultaneous communications establishing means 42.

As will be appreciated by those of skill in this art, the above-described aspects of the present invention in FIG. 2 may be provided by hardware, software or a combination of the above. While the various components of mobile terminal 30 have been illustrated in FIG. 2 as discrete elements, they may in practice be implemented by a microcontroller including input and output ports and running software code, by custom or hybrid chips, by discrete components or by a combination of the above. For example, simultaneous communications establishing means 42, reporting circuit 57, storage circuit 34, comparing means 46 and synchronizing means 38 could all be implemented as a single programmable device. Alternatively, comparator 54 can be implemented as a discrete comparator device comparing an analog signal on connection 56 with a reference switching level.

While two simultaneous communications may be implemented in a mobile terminal 30, according to the present invention in an analog cellular network environment with duplicate transmit and receive circuitry, the benefits of the present invention are particularly directed to public land mobile networks and private radio communications network within the public land mobile networks which operate according to digital, specifically time division multiplex architecture ("TDMA") standards. Examples of such advanced digital standards include GSM and D-AMPS. The following discussion of the apparatus and methods of the present invention will be described with general reference to TDMA and particularly to the GSM standard for ease of understanding.

A TDMA system may be implemented by subdividing the frequency bands employed in conventional FDMA systems into sequential time slots. Although communication on frequency bands typically occur on a common TDMA frame that includes a plurality of time slots, communications on each frequency band may occur according to a unique TDMA frame, with time slots unique to that band. Examples of systems employing TDMA are the dual analog/digital IS-54B standard employed in the United States, in which each of the original frequency bands of EIA-553 is subdivided into 3 time slots, and the European GSM standard, which divides each of its frequency bands into 8 time slots. In these TDMA systems, each user communicates with the base station using bursts of digital data transmitted during the user's assigned time slots. A channel in a TDMA system typically includes one or more time slots on one or more frequency bands.

Because it generally would be inefficient to permanently assign TDMA time slots to a mobile terminal, typical PLMNs assign time slots on an as-needed basis to more efficiently use the limited carrier frequency spectrum available to the system. Therefore, a critical task in radiotelephone communications is providing a mobile terminal with access to the system, i.e., assigning time slots corresponding to a voice or data channel to a mobile terminal when it desires to communicate with another mobile terminal or with a landline telephone via the PSTN. This task is encountered both when a mobile terminal attempts to place a call and when a mobile terminal attempts to respond to a page from another mobile terminal or conventional telephone.

Access to a PLMN may be provided in a number of ways. For example, a polling technique may be utilized whereby a central or base station serially polls users, giving each an opportunity to request access in an orderly fashion, without contention. However, serial polling tends to be impractical for PLMNs because typical PLMN's may have hundreds, if not thousands, of users. Those skilled in the art will appreciate that serially polling this many users can be extremely inefficient, especially when one considers that many of the users may not desire access at all, or may not desire access at the particular moment they are polled.

For this reason, PLMNs typically use random access techniques, whereby a mobile terminal desiring a voice or data channel randomly sends an access request to the base 16 or hub station, which the central or base station 16 acknowledges by establishing a communications channel to the requesting mobile terminal, if available. An example of a random access technique for a TDMA PLMN is that used in the GSM system. In the GSM system, a set of Common Control Channels (CCCHs) is shared by mobile terminals in the system and includes one or more Random Access Channels (RACHs).

Mobile terminals typically do not include an uplink receiver with which to monitor the status of the RACH to determine whether other mobile terminals are currently requesting access. If a mobile terminal desires access, the mobile terminal typically transmits a random access channel signal, which may include a random reference and synchronization sequence, in what is often referred to as a "RACH burst." A RACH burst typically contains several fields, including a plurality of guard bits, a sequence of synchronization bits, and a sequence of information bits. The guard bits are used to prevent overlap of communications occurring on adjacent time slots, as discussed below. The synchronization sequence is used by the receiving station 16 to synchronize with the RACH burst, in order to decode the information contained in the information sequence. The information sequence may also include a number of subfields, for example, a random reference number field which serves as a "tag" for identifying a particular random access request from a particular mobile terminal.

In a GSM system, a RACH is a dedicated TDMA time slot on a carrier frequency band, used by mobile terminals to request access to the communications system. Mobile terminals typically time their RACH bursts to fall within an assigned TDMA time slot for the RACH, for example, by waiting a predetermined period after a transition in a synchronization signal transmitted by base station 16 and then transmitting the RACH burst. However, because mobile terminals conventionally use a common TDMA time slot for transmitting RACH burst, there is probability of collisions between access requests which are transmitted simultaneously or nearly simultaneously by neighboring mobile terminals. To deal with these collisions, base station 16 typically implements some form of contention-resolving protocol. For example, base station 16 may refuse to acknowledge simultaneous requests, requiring a requesting mobile terminal to reassert its request if it continues to desire access after failing to establish a channel. Contention-resolving protocols may also use a variety of predetermined delays and similar techniques to reduce the likelihood of mobile terminal engaging in repeated collisions subsequent to a first collision. Contention logic used in the European GSM system is described in *The GSM System for Mobile Communications* published by M. Mouly and M. B. Pautet, 1992, at pages 368–72.

In addition to colliding with other RACH bursts, a RACH burst may overlap other TDMA time slots, causing undue interference on channels using those slots. Before requesting a channel, a mobile terminal may be only roughly synchronized with the base station 16 TDMA frame, for example, by aligning its internal time reference with the synchronization signal transmitted by base station 16 in an open loop fashion. In practicing the present invention, it is only this rough synchronization that needs to be performed by mobile terminal 30 prior to call setup of the simultaneous second radio communication connection. Finer synchronization, however, typically occurs only after base station 16 acknowledges mobile terminal 30's request for access and provides mobile terminal 30 with signals which allow the propagation delay between the mobile terminal 30 and base station 16 to be determined. With this information, mobile terminal 30 can adjust its TDMA bursts to prevent collision with bursts from other mobile terminals arriving at base station 16 on adjacent TDMA slots.

However, a mobile terminal requesting access prior to such synchronization generally suffers from a time ambiguity with respect to other TDMA bursts in the system, because propagation delay varies with position in the coverage area. When a mobile terminal is only roughly synchronized, its internal timing may be significantly skewed with respect to the TDMA frame of base station 16. Uncompensated, this time skew may cause, for example, a RACH burst transmitted by the mobile terminal to have a significant overlap with voice or data communications transmitted by another mobile terminal on an adjacent time slot. This overlap may cause undesirable interference and diminish communications quality.

TDMA PLMNs may compensate for this problem by incorporating guard time or guard bits in each TDMA slot, typically preceding data bits which carry synchronization, voice, data or other information. Guard bits are inserted in each time slot, during which the receiving unit disregards incoming signals because they may be corrupted by overlapping RACH bursts and other sources of interference. Because the maximum time ambiguity in a PLMN tends to be relatively small with respect to a TDMA frame, the number of guard bits needed to ensure acceptable signal quality typically is small. For example, the GSM system incorporates approximately 68.25 guard bits in each time slot for a RACH burst to ensure that RACH bursts from a mobile terminal as far as 35 kilometers away from base station 16 will not cause undue interference on other TDMA slots. This can be contrasted to the 8.25 guard bits provided by GSM for a normal traffic burst (time slot). The fmer synchronization required for the limited guard bits of a normal traffic burst is dependent on time alignment information derived from the RACH reception, therefore, the RACH burst itself requires the larger guard time.

Synchronization may be accomplished by mobile terminal 30 by matching its transmission frame timing to that of the overlaying PLMN. Mobile terminal 30 applies the same frame timing to all of its transmission, thereby driving the frame timing reference of private base station 24 into synchronization with the frame timing of the overlaying PLMN. Regardless of whether the private radio communications network is a residential private radio communications network 12, 12', 12" or a multi-user office private radio communications network 14, the smaller private radio communications network is contained within a common overlaying PLMN. Accordingly, in the case of multi-user network 14, any one mobile terminal 30 may synchronize the whole multi-user network 14 to the frame timing of the overlaying PLMN by establishing the frame timing for its particular private base station 24 which is in turn interconnected to any other base stations 24 within the private network 14 by PBX 22.

Mobile terminal 30 synchronizes to the PLMN base station 16 during idle frames. It then uses this synchronization reference for its transmissions to and receptions from the base station of private radio communications network 12, 12', 12" using no (zero) time alignment. Because the distance between mobile terminal 30 and the base station of private radio communications network 12, 12', 12" is typically short, no time alignment is required. The base station of private radio communications network 12, 12', 12" synchronizes to the transmission of mobile terminal 30.

When a new second radio connection to the PLMN base station 16, 16', 16" is established mobile terminal 30 may have to use a time alignment in its transmission to cover the (larger) distance from mobile terminal 30 to the PLMN base station 16, 16', 16". The transmission to the PLMN in mobile terminal 30 is then advanced with respect to the receive timing. This advance is not used in the transmission to the base station of private radio communications network 12, 12', 12" to avoid misalignment of the reception of radio signals at the mobile terminal 30. Therefore, for mobile terminal 30 reception, synchronization is based on the reception of transmissions from the PLMN. Transmissions to the PLMN are based on the timing alignment ordered by the PLMN. Finally, no timing alignment is used for transmissions to private radio communications network 12, 12', 12".

For half rate channels the frames used for the PLMN transmission use timing alignment and the frames used for communications with private radio communications network 12, 12', 12" do not use timing alignment. For dual-slot operation, overlap of the two bursts from mobile terminal 30 should be prevented. This can be accomplished by avoiding use of adjacent slots or using the leading slot for the radio connection to the PLMN which is to be advanced (so that it can be advanced without overlapping the unadvanced radio connection slot).

Figure 3:
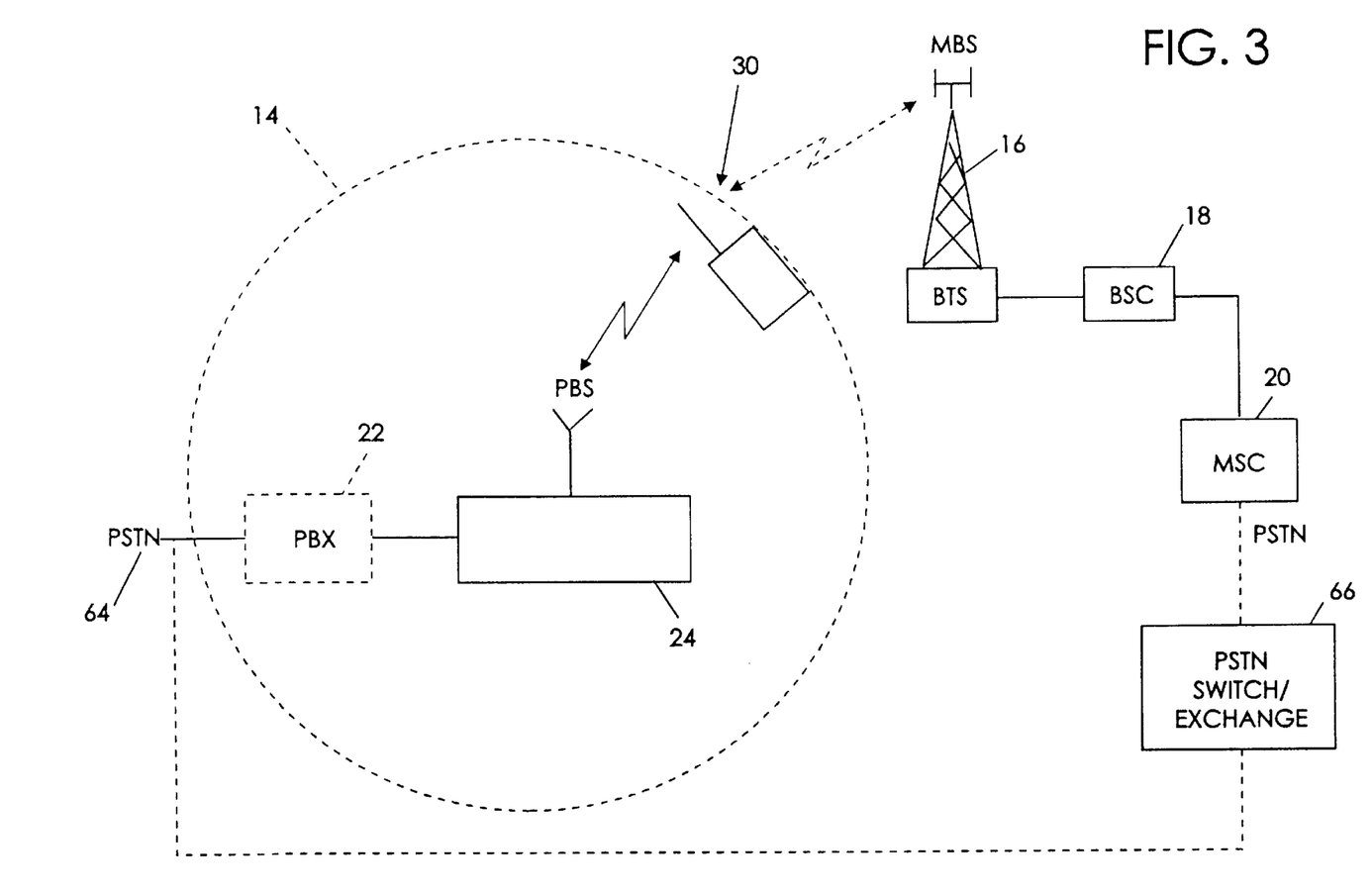
FIG. 3 schematically illustrates the operating environment of the present invention.

Referring now to FIG. 3, an illustration is shown wherein the user of mobile terminal 30 has moved to the border of the coverage range of private radio communications network 14. Mobile terminal 30 has an established first communication connection with wire line or PSTN switch 66 which is partly a wire line connection but also includes a first radio communication connection with private base station 24 of private communications network 14. During the idle frames of communication by mobile terminal 30 over the first radio communication connection, mobile terminal 30 monitors mobile base station 16 of the public land mobile network and is roughly synchronized to mobile base station 16 as described above. Accordingly, during the local call from PSTN 64 through PBX 22 and private base station 24 (the first radio communication connection), mobile terminal 30 is synchronized to both private network 14 and the public land mobile network. In addition, private base station 24 is synchronized to mobile terminal 30 which results in a synchronization of private base station 24 and mobile base station 16.

As will be described more fully later in connection with the description of the operation of the present invention, once mobile terminal 30 has moved a sufficient distance from private network 14 to cause a signal quality indicator to violate a predetermined switching level, mobile terminal 30 establishes a simultaneous second radio communication connection between mobile base station 16 of the public land mobile network and mobile terminal 30. This second radio communication connection is provided without requiring dual independent transceivers as will be described below because mobile terminal 30, according to the present invention, has synchronized the two otherwise independently operated TDMA networks.

Figure 4:
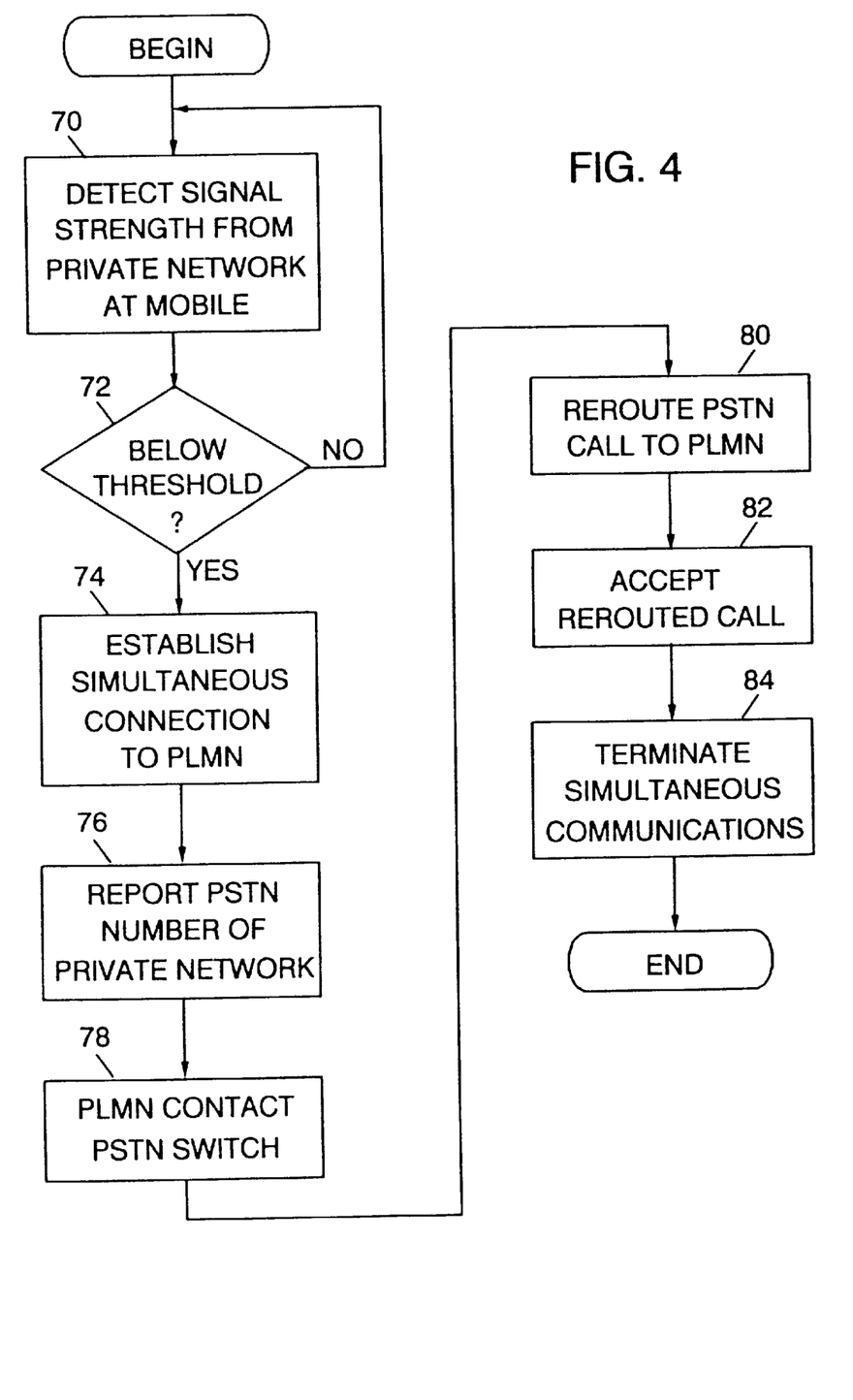
FIG. 4 is a flowchart illustrating operations of handover of a call from a private radio communications network to an overlaying public land mobile network according to a method of the present invention.

Referring now to FIG. 4, an embodiment of the operations of the mobile terminal and method for handover of the present invention will be described. Mobile terminal 30 detects the quality of the signal from private network 14 on the first radio communication connection from private network 14 at block 70. When the quality of the detected signal is determined to have violated an acceptable level based upon a predetermined switching criteria at block 72, mobile terminal 30 initiates handover of the first communication connection from private network 14 to the public land mobile network. The quality of the communication with private network 14 can be determined by a variety of methods known to one of skill in the art including derivation of a received signal strength indication ("RSSI") and/or the bit error rate ("BER"). The switching criteria may be a minimum RSSI or a maximum BER or a function of both. The switching criteria may also be based on function of signal quality rather than absolute levels, for example a derivative function indicating a trend of degrading signal quality.

At block 74, mobile terminal 30 establishes a second radio communication channel to the public land mobile network simultaneously with the first radio communication connection with private network 14. The second radio communication connection is initiated by mobile terminal 30 initiating a call setup to the public land mobile network as described above. Call setup takes place in parallel to the continuing local call underway through the first radio communication connection with private network 14. Simultaneous calls can be accomplished by mobile terminal 30 without the necessity for separate redundant circuitry by using two half-rate channels in mobile terminal 30 where one half-rate channel is used for the first radio communication connection with private network 14 and the other half-rate channel is used to communicate with the public land mobile network. Alternatively, mobile terminal 30 may be a dual-slot mobile phone where one slot constitutes the connection with private network 14 and the other slot the connection to the public land mobile network. Either of these options can be used with the present invention due to the fact that mobile terminal 30 is synchronized to private base station 16 and to private network 14 through the ongoing first radio communication connection with private network 14.

After call setup, mobile base station 16 allocates a stand alone dedicated control channel ("SDCCH") or a traffic channel ("TCH") to mobile terminal 30. At block 76, mobile terminal 30 reports the PSTN or ISDN wire line number of private network 14 to the public land mobile network over the second radio communication connection. The wire line number was either communicated to mobile terminal 30 at local call setup with private network 14 or is transferred from private base station 24 to mobile terminal 30 via a fast or slow associated communication control channel ("FACCH" or "SACCH"). To initiate re-routing a message including the local wire line number of private network 14 is then routed through the wire interconnect of the public land mobile network to the wire line (PSTN) exchange/switch 66 at block 78. At block 80, the wire line network reroutes the first communication connection from private network 14 to the public land mobile network.

At block 82, mobile terminal 30 receives and accepts the rerouted local call from mobile base station 16 of the public land mobile network which signals mobile terminal 30 to switch to the assigned cellular channel for the call and continue the local call through the public land mobile network. At block 84, mobile terminal 30 terminates the first radio communication connection through private network 14 and returns to full-rate (if formerly half-rate was used for simultaneous connections) or to single-slot operation (if formerly a dual-slot operation was used for simultaneous connections) or remains on a half-rate channel. This ends the handover procedure.

Figure 5A:
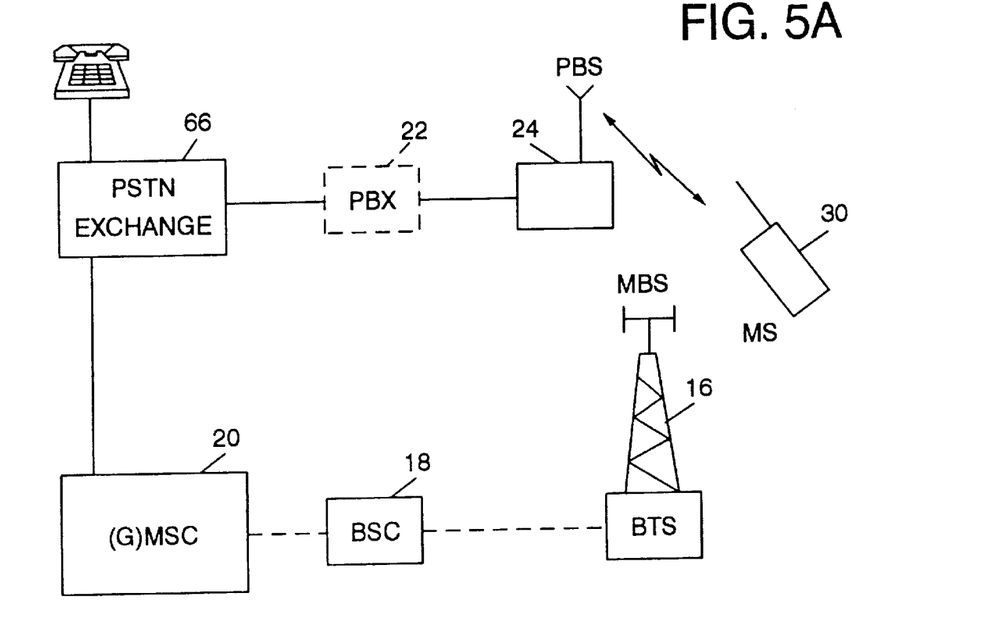
FIG. 5A and FIG. 5B schematically illustrate call routing respectively before and after handover according to the present invention.
Figure 5B:
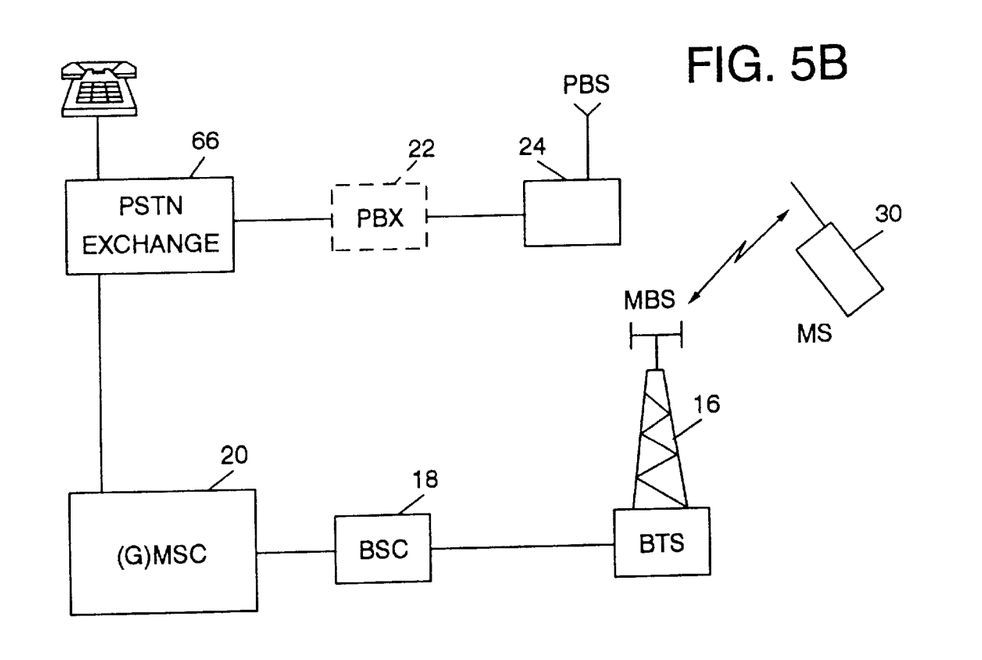

Referring now to FIG. 5A and FIG. 5B, the routing of the local call (first communication connection) before and after handoff in accordance with the methods of the present invention are illustrated. In FIG. 5A, mobile terminal 30 is shown with its first radio communication connection via private base station 24. As shown in FIG. 5A, PSTN exchange 66 is also operably connected to mobile switching center 20 which links into the wired infrastructure of the public land mobile network including base station controller 18 and mobile base station 16.

The routing of the local call after handover in accordance with the present invention is illustrated in FIG. 5B. Mobile terminal 30 has an established traffic communication channel with mobile base station 16 over which the local call of the first communication connection is now being transmitted. Call re-routing has been accomplished as illustrated in FIG. 5B by routing the local call from PSTN exchange 66 to mobile switching center 20 instead of PBX 22 of private network 14.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for mobile assisted handover between a TDMA private radio communications network connected to a wire line switch and having a wire line number and a TDMA public land mobile network, of a first communication connection between a mobile terminal and the wire line switch including a first radio communication connection between the mobile terminal and the private radio communications network, said method comprising the steps of:

monitoring a base station of the public land mobile network having a frame timing at the mobile terminal and synchronizing a frame timing of the mobile terminal to the frame timing of the base station of the public land mobile network;

establishing the first radio communication connection between the mobile terminal and a base station of the private radio communications network using the frame timing of the mobile terminal, the base station of the private radio communications network having a frame timing uncoordinated with the frame timing of the base station of the public land mobile network in that common shared frame timing is not provided between the private radio communications network and the public land mobile network;

detecting a signal quality of the first radio communication connection from the private radio communications network at the mobile terminal;

establishing a second radio communication connection between the mobile terminal and the public land mobile network simultaneously with the first radio communication connection if the detected signal quality has violated a predetermined switching criteria;

reporting the wire line number of the private radio communications network to the public land mobile network over the second radio communication connection; and, initiating rerouting of the first communication connection from the wire line switch to the public land mobile network.

2. The method of claim 1 wherein said initiating step is followed by the step of accepting the rerouted first communication connection from the public land mobile network.

3. The method of claim 2 wherein said accepting step is followed by the step of disconnecting the first radio communication connection between the mobile terminal and the private radio communications network.

4. The method of claim 1 wherein said establishing step includes the step of synchronizing communications timing between the base station of the public land mobile network and the base station of the private radio communications network.

5. The method of claim 1 wherein the mobile terminal is a dual-slot mobile phone and wherein said establishing step includes the step of allocating a first slot to the first radio communication connection and a second slot to the second radio communication connection.

6. The method of claim 1 wherein said establishing step includes the step of allocating a first half rate channel to the first radio communication connection and a second half rate channel to the second radio communication connection.

7. The method of claim 1 wherein said step of monitoring a base station of the public land mobile network includes the step of synchronizing the mobile terminal to the monitored base station of the public land mobile network while the first communications connection is routed to the mobile terminal over the private radio communications network.

8. The method of claim 7 wherein said monitoring step is performed by the mobile terminal during idle frames.

9. The method of claim 1 wherein said detecting step includes the step of determining a received signal strength indication for the first radio communication connection between the mobile terminal and the private radio communications network.

10. The method of claim 9 wherein said detecting step further includes the step of determining a bit error rate for the first radio communication connection between the mobile terminal and the private radio communications network.

11. The method of claim 1 wherein said reporting step includes the step of obtaining the wire line number from the private radio communications network over a radio communication control channel between the mobile terminal and the private radio communications network.

12. A method for mobile assisted handover between a private radio communications network connected to a wire line switch and having a wire line number and a public land mobile network of a first communication connection between the mobile terminal and the wire line switch including a first radio communication connection between the mobile terminal and the private radio communications network, said method comprising the steps of:

monitoring a base station of the public land mobile network at the mobile terminal and synchronizing the mobile terminal to the base station of the public land mobile network;

establishing the first radio communication connection between the mobile terminal and a base station of the private radio communications network which is not coordinated with the base station of the public land mobile network, in that common shared frame timing is not provided between the private radio communications network and the public land mobile network, by synchronizing the base station of the private radio communications network to the mobile terminal;

detecting a signal quality of the first radio communication connection from the private radio communications network at the mobile terminal;

establishing a second radio communication connection between the mobile terminal and the public land mobile network simultaneously with the first radio communication connection if the detected signal quality has violated a predetermined switching criteria; and reporting the wire line number of the private radio communications network to the public land mobile network over the second radio communication connection.

13. The method of claim 12 wherein said reporting step is followed by the steps of:

accepting the rerouted first communication connection from the public land mobile network; and disconnecting the first radio communication connection between the mobile terminal and the private radio communications network.

14. The method of claim 13 wherein the public land mobile network and the private radio communications network are both TDMA systems.

15. The method of claim 14 wherein said step of monitoring a base station of the public land mobile network includes the step of synchronizing the mobile terminal to the monitored base station of the public land mobile network while the first communications connection is routed to the mobile terminal over the private radio communications network.

16. A radio communications mobile terminal for use with a private radio communications network connected to a wire line switch and having a wire line number located within a public land mobile network, comprising:

means for monitoring a base station of the public land mobile network at the mobile terminal and synchronizing the mobile terminal to the base station of the public land mobile network;

means for establishing a first radio communication connection between the mobile terminal and a base station of the private radio communications network which is not coordinated with the base station of the public land mobile network, in that common shared frame timing is not provided between the private radio communications network and the public land mobile network by synchronizing the base station of the private radio communications network to the mobile terminal;

detecting means for detecting a signal quality from said private radio communications network during the first radio communication connection between said mobile terminal and said private radio communications network;

simultaneous communication establishing means responsive to said detecting means for establishing a second radio communication connection between said mobile terminal and said public land mobile network simultaneously with said first radio communication connection if said detected signal quality has violated a stored switching criteria; and, wire line reporting means for reporting said stored wire line number to said public land mobile network over said second radio communication connection.

17. The mobile terminal of claim 16 wherein the public land mobile network and the private radio communications network are both TDMA systems.

18. The mobile terminal of claim 17 wherein said monitoring means includes means for monitoring the base station of said public land mobile network during idle frames.

19. The mobile terminal of claim 17 wherein said simultaneous communication establishing means includes means for allocating a first slot to the first radio communication connection and a second slot to the second radio communication connection.

20. The mobile terminal of claim 17 wherein said simultaneous communication establishing means includes means for allocating a first half rate channel to the first radio communication connection and a second half rate channel to the second radio communication connection.

21. A radio communications mobile terminal for use with a TDMA private radio communications network connected to a wire line switch and having a wire line number located within a TDMA public land mobile network, comprising:

radio transceiving means for receiving and transmitting radio communications signals between said mobile terminal and said private radio communications network and between said mobile terminal and said public land mobile network, wherein the private radio communications network is not coordinated with the public land mobile network in that common shared frame timing is not provided between the private radio communications network and the public land mobile network;

detecting means operably connected to said radio transceiving means for detecting a signal quality from said private radio communications network during a first radio communication connection between said mobile terminal and said private radio communications network;

comparing means operably connected to said detecting means for comparing said detected signal quality to a predetermined switching criteria;

simultaneous communication establishing means and electrically connected to said transceiving means and responsive to said comparing means for establishing a second radio communication connection between said mobile terminal and said public land mobile network simultaneously with said first radio communication connection if said detected signal quality has violated said predetermined switching criteria, said simultaneous communication establishing means including synchronizing means operably connected to said radio transceiving means for synchronizing radio communications between said mobile terminal and said private radio communications network and said public land mobile network so as to provide a common frame timing for all simultaneous radio communications; and, reporting means for reporting said wire line number to said public land mobile network and requesting rerouting of said first radio communication connection from said private radio communications network to said public land mobile network over said second radio communication connection.

22. The mobile terminal of claim 21 wherein said synchronizing means includes means for monitoring said public land mobile network during idle frames and wherein said wire line switch is a PSTN switch and said wire line number is a PSTN number.

23. The mobile terminal of claim 21 wherein said simultaneous communication establishing means includes means for allocating a first slot to the first radio communication connection and a second slot to the second radio communication connection.

24. The mobile terminal of claim 21 wherein said simultaneous communication establishing means includes means for allocating a first half rate channel to the first radio communication connection and a second half rate channel to the second radio communication connection.

* * * * *

UNITED STATES PATENT AND TRADEMARK OFFICE
CERTIFICATE OF CORRECTION

PATENT NO. : 6,112,088
DATED : August 29, 2000
INVENTOR(S) : Jacobus Cornelis Haartsen It is certified that error appears in the above-identified patent and that said Letters Patent is hereby corrected as shown below:

In the Title:
Please delete "SYSTEM" and substitute – SYSTEMS – therefor.
Please delete "METHOD" and substitute – METHODS – therefor.

Signed and Sealed this

Seventeenth Day of April, 2001

NICHOLAS P. GODICI

Attest:

Attesting Officer

Acting Director of the United States Patent and Trademark Office